United States Patent [19]

Iwase et al.

[11] Patent Number: 5,543,080
[45] Date of Patent: Aug. 6, 1996

[54] METHOD OF FORMING AN X-RAY IMAGE USING PHOTOSTIMULABLE PHOSPHOR

[75] Inventors: Nobuhiro Iwase, Atsugi; Hiroshi Kano, Sagamihara; Shinji Tadaki, Atsugi; Masami Hasegawa; Nagaaki Koshino, both of Yokohama, all of Japan

[73] Assignee: Fujitsu Limited, Kawasaki, Japan

[21] Appl. No.: 378,319

[22] Filed: Jan. 25, 1995

Related U.S. Application Data

[60] Continuation of Ser. No. 98,722, Jul. 29, 1993, abandoned, which is a division of Ser. No. 54,343, Apr. 7, 1993, abandoned, which is a continuation of Ser. No. 585,625, Sep. 20, 1990, abandoned.

[30] Foreign Application Priority Data

Sep. 20, 1989 [JP] Japan ..................... 1-241801

[51] Int. Cl.$^6$ .......................................... C09K 11/61
[52] U.S. Cl. .......................................... 252/301.4 H
[58] Field of Search ............................ 252/301.4 H

[56] References Cited

U.S. PATENT DOCUMENTS

| | | | |
|---|---|---|---|
| 3,163,608 | 12/1964 | Yocom | 252/301.4 H |
| 3,447,097 | 5/1969 | Kiss | 252/301.4 H |
| 3,859,527 | 1/1975 | Luckey | 250/327 |
| 4,239,968 | 12/1990 | Kotera et al. | 250/327.1 |

FOREIGN PATENT DOCUMENTS

| | | |
|---|---|---|
| 896453 | 3/1972 | Canada ............... 252/301.4H |
| 102051 | 3/1984 | European Pat. Off. . |
| 107192 | 5/1984 | European Pat. Off. . |
| 159015 | 10/1985 | European Pat. Off. . |
| 159014 | 10/1985 | European Pat. Off. . |
| 174875 | 3/1986 | European Pat. Off. . |
| 8908921 | 9/1989 | European Pat. Off. . |
| 2-58593 | 2/1990 | Japan . |

OTHER PUBLICATIONS

Patent Abstracts of Japan, vol. 14, No. 232 (C–719) (4175) 17 May 1990, & JP–A–2 58593 (Fujitsu) 27 Feb. 1990, the whole document.
Patent Abstracts of Japan, vol. 14, No. 261 (C–725) (4204) 6 Jun. 1990, & JP–A–2 75686 (Fujitsu) 15 Mar. 1990, the whole document.
K. Takahashi et al., "Phosphostimulated Luminescence (PSL) and Color Centers in BaFX=Eu$^{2+}$+(X–Cl, Br, I) Phosphors", J. Electrochem. Soc., Jun. 1985, pp. 1492–1494.

*Primary Examiner*—Melissa Bonner
*Attorney, Agent, or Firm*—Staas & Halsey

[57] ABSTRACT

A method for forming an X-ray image. The method involves the use of an X-ray transforming sheet which includes a novel stimulable phosphor on a substrate. The phosphor has a high sensitivity to a semiconductor laser as a stimulating light and is represented by the formula:

$$\{(M''X^1_{2-2u}X^2_{2u})_{1-x-y}(M'X^1_{1-v}X^2_v)_x(M'''X^1_{3-3w}X^2_{3w})_y\}_{1-a}A_a:bEu^{2+}$$

where $M''$ represents at least one divalent metal such as Ba, Be, Mg or Ca; $M^1$ represents at least one monovalent metal such as Li, Na, K, Rb or Cs; $M'''$ represents at least one trivalent metal such as Sc, La, Y, Ce, Pr, Nd, Sm, Gd, Tb, Dy, Ho, Er, Tm, Yb, Lu, Al, Ga, In or Tl; $X^1$ represents Br or Cl; $X^2$ represents at least one halogen atom that is different from $X^1$; A represents at least one metal oxide such as BeO, MgO, CaO, SrO, BaO, ZnO, Al$_2$O$_3$, Y$_2$O$_3$, La$_2$O$_3$, In$_2$O$_3$, Ga$_2$O$_3$, SiO$_2$, TiO$_2$, ZrO$_2$, GeO$_2$, SnO$_2$, Nb$_2$O$_5$, Ta$_2$O$_5$ and ThO$_2$; and wherein 0>x+y>0.5; 0>u+v+w<0.1; 0>a>0.1; and 0<b>0.2. The transforming sheet is exposed to X-rays and then the exposed phosphor is stimulated with electromagnetic radiation to release the stored energy as a phosphostimulated luminescent light which may be detected to thereby obtain an image of the object.

4 Claims, 7 Drawing Sheets

METHOD OF FORMING AN X-RAY IMAGE USING PHOTOSTIMULABLE PHOSPHOR

This application is a continuation of application Ser. No. 08/098,722, filed Jul. 29, 1993, now abandoned, which is a divisional of application Ser. No. 08/054,343, filed Apr. 7, 1993, now abandoned, which is a continuation of application Ser. No. 07/585625, filed Sep. 20, 1990, now abandoned.

BACKGROUND OF THE INVENTION

1. Field of the Invention

The present invention relates to stimulable phosphors, methods of making same, and X-ray image transforming sheets. More specifically, the present invention relates to stimulable phosphors activated by divalent europium, and the uses thereof. Such phosphors emit a light having a peak near to 400 nm when excited by radiation such as X-rays, electron beams or ultraviolet rays, and further, release a light having a peak near to 400 nm when later irradiated with visible or infrared light. The latter released light is called photostimulated luminescence, and is used for storing the energy of radiation and transforming it into visible light. In particular, such released light is used for transforming radiation images into visible images and one of the most important applications thereof relates to X-ray image production for medical use.

2. Description of the Related Art

In X-ray image production using stimulable phosphors, X-rays transmitted through a part of a living body, such as a breast, are irradiated to a stimulable phosphor sheet or panel containing a stimulable phosphor, and the stimulable phosphor sheet or panel is then scanned by a laser beam. When excited by laser beams, stimulable phosphors release energy stored in crystals of the phosphor as stimulated luminescence of near-ultraviolet light corresponding to the stored energy. The near-ultraviolet light is detected by a detector such as a photoelectron multificator and then transformed into an electric signal. The electric signal is treated and displayed on a cathode ray tube (CRT), or is used to modulate the intensity of another laser beam scanning and exposing a silver salt film, which is then developed to produce a visible image.

This method of transforming a laser beam into a visible image has remarkable useful features, such as the following.

(1) It is possible to reduce the amount of X-ray exposure.

(2) A satisfactory image can be produced bypersons not skilled in the art, since stimulable phosphors have an X-ray sensitive range wider than that of a silver salt film, and thus the adjustment of the X-ray exposure for producing an image is easy.

(3) Since the image is transformable into an electric signal, various image treatments such as contour emphasizing can be easily effected.

(4) After producing an image, the X-ray image transforming sheet can be used repeatedly by irradiating the phosphor sheets with a stimulating light to release all stored energy and return the sheets to their original state.

Some stimulable phosphors used for these purposes, for example, cerium and samarium-activated strontium sulfide phosphors (SrS:Ce,Sm), europium and samarium-activated lanthanum oxisulfide phosphors ($La_2O_2S$:Eu,Sm), and manganese and halogen-activated zinc cadmium sulfide phosphors [(ZnCd)S:Mn,X; where X is a halogen], as disclosed in G.B. Patent No. 1462769 or U.S. Pat. No. 3,859,527, are known. Japanese Unexamined Patent Application (Kokai) No. 55-12143 discloses stimulable phosphors having the formula ($Ba_{1-x-y}$ $Mg_x Ca_y$)FX:Eu where X is Br or Cl; Japanese Unexamined Patent Publication (Kokai) No. 55-84389 discloses stimulable phosphors having the formula BaFX:Ce,A where X is Cl, Br or I and A is In, Tl, Gd, Sm or Zr; and Japanese Unexamined Patent Publication (Kokai) No. 60-84381 discloses stimulable phosphors having the formula $MX_2 aMX'_2$:Eu where M is Ba, Sr or Ca and X and X' are Cl, Br or I.

Nevertheless, these stimulable phosphors are not adequate for intended industrial applications.

Namely, the stimulable phosphors disclosed in G.B. Patent No. 1,462,769 and U.S. Pat. No. 3,859,527 have low X-ray sensitivity.

The stimulable phosphors disclosed in Japanese Unexamined Patent Publication (Kokai) Nos. 55-12143 and 55-84389 have practical reading sensitivities when subjected to stimulation by visible lasers, e.g., helium neon lasers, but can not be stimulated by infrared semiconductor lasers made of a material such as GaAs, GaAlAs or InP-GaAs, and therefore, are not practical. The stimulable phosphors disclosed in Japanese Unexamined Patent Publication (Kokai) Nos. 60-84381 and 55-12143 have spectrums of stimulated luminescence for reading that extend to slightly longer wave lengths, but do not have sufficient characteristics for practical reading by semiconductor lasers.

The stimulable phosphors disclosed in Japanese Unexamined Patent Publication (Kokai) No. 60-84381 are MFXX':Eu. These phosphors are similar to the MFX:Eu phosphors disclosed in Japanese Unexamined Patent Publication (Kokai) No. 55-12143 except that a portion of the F is replaced by a halogen X' which is different from F and X, but do not have a practical sensitivity for reading by a semiconductor laser. When the intensity of stimulated luminescence measured by stimulating the phosphors MFXX':Eu by light having a wave length of 780 nm is compared with that of MFX:Eu, it is shown that MFX:Eu exhibits a luminescence intensity in a near-infrared wave length range that is larger than the almost zero luminescence of the other stimulable phosphors. However, the luminescence intensity of MFX:Eu is still too low for practical use.

The object of the present invention is to provide novel stimulable phosphors capable of releasing luminescence having a practical intensity when stimulated by a near-infrared ray of a semiconductor laser. The semiconductor lasers of the present invention comprise those having a high output at a wave length longer than 500 nm, particularly longer than 760–780 nm. Although semiconductor lasers having an output at higher wave lengths, i.e., visible light, have been developed, semiconductor lasers having a sufficient output for X-ray image transformation are limited to those having the above wave lengths, More specifically, an output power of at least 20 mW is necessary, which limits the semiconductor laser to the above lasers.

SUMMARY OF THE INVENTION

In accordance with the invention it has been found that novel europium-activated barium bromide and related phosphors have a practical high infrared stimulated sensitivity allowing reading by stimulation with semiconductor lasers. More specifically, the novel stimulable phosphors are represented by the following formula:

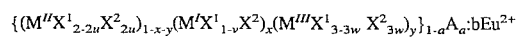

where $M^{II}$ represents at least one divalent metal selected from the group consisting of Ba, Be, Mg and Ca; $M^{I}$ represents at least one monovalent metal selected from the group consisting of Li, Na, K, Rb and Cs; $M^{III}$ represents at least one trivalent metal selected from the group consisting of Sc, Y, La, Ce, Pr, Nd, Sm, Gd, Tb, Dy, Ho, Er, Tm, Yb, Lu, Al, Ga, In and Tl; $X^1$ represents an element selected from the group consisting of Br and Cl; $X^2$ represents at least one halogen atom that is different from $X^1$; A represents at least one metal oxide selected from the group consisting of BeO, MgO, CaO, SrO, BaO, ZnO, $Al_2O_3$, $Y_2O_3$, $La_2O_3$, $In_2O_3$, $Ga_2O_3$, $SiO_2$, $TiO_2$, $ZrO_2$, $GeO_2$, $SnO_2$, $Nb_2O_5$, $Ta_2O_5$ and $ThO_2$; and wherein $0>x+y>0.5$; $0>u+v+w<0.1$; $0>a>0.1$; and $0<b>0.2$.

DESCRIPTION OF THE PREFERRED EMBODIMENTS

Figure 1:
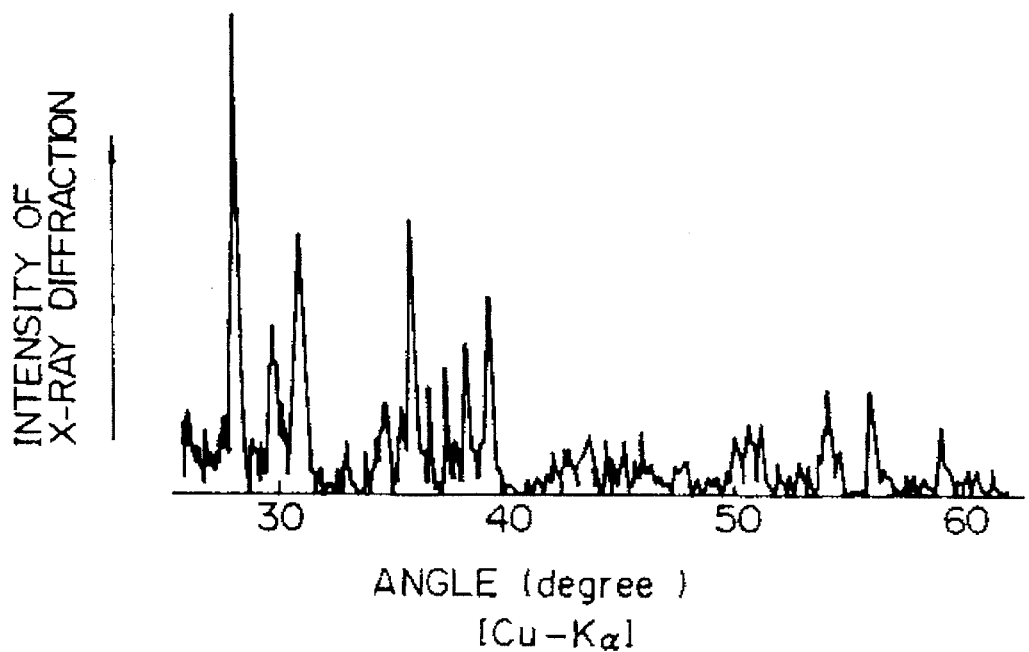
FIG. 1 is a diagram illustrating an X-ray diffraction pattern of $BaBr_2:Eu^{2+}$.

The stimulated luminescence phenomenon of the stimulable phosphors of the present invention is described with the use of $BaBr_2:Eu^{2+}$ as an example. When irradiated with X-rays or ultraviolet rays, Eu, an emission center, emits a blue light when excited, i.e., it emits photoluminescence. Simultaneously, electrons in some Eu atoms are excited and captured by color centers. The color center is a lattice defect of Br and is electrically positively charged, and thus the electrons are captured by the color centers, which is the memory. Then, if the stimulable phosphor is irradiated with a red or infrared light, the electrons captured in the color centers are excited and returned to the original Eu, while a blue light is emitted. This is known as a stimulated luminescence. The intensity of the stimulated luminescence relates to the intensity of the X-ray beam.

Europium is essential to the photostimulated luminescence of the stimulable phosphors of the present invention, but if the content of europium is more than 20 mole %, the crystallinity of

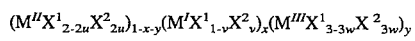

is damaged and the intensity of photostimulated luminescence is undesirably lowered. Therefore, $0<b>0.2$, preferably $0.0005>b>0.002$, from the viewpoint of the intensity of the photostimulated luminescence.

The compound

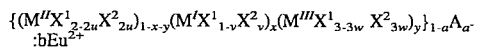

(wherein $X^1$ represents either Br or Cl and $X^2$ represents a halogen atom which is different from $X^1$) includes the following:

1) $BaBr_2:bEu^{2+}$.

2) $BaCl_2:bEu^{2+}$.

3) $Ba_{1-u}M^1{}_uBr_2:bEu^{2+}$ where $M^1$ is at least one of Be, Mg and Ca and $0<u>1$. That is, Ba may be partly or completely replaced by Be, Mg, Ca or Sr, each of which is a divalent metal.

4) $(BaBr_2)_{1-x}(M'Br)_x:bEu^{2+}$ where $M'$ is at least one of the monovalent metals Li, Na, K, Rb and Cs, and $0<x>0.5$, preferably $0<x>0.05$, more preferably $0<x>0.01$. That is, Ba may be partly replaced by a monovalent metal.

5) $(BaBr_2)_{1-y}(M'''Br_3)_y:bEu^{2+}$ where $M'''$ is at least one of the trivalent metals Sc, Y, La, Ce, Pr, Nd, Sm, Gd, Tb, Dy, Ho, Er, Tm, Yb, Lu, Al, Ga, In and Tl, and $0<y>0.5$, preferably, $0<y>0.05$, more preferably $0<y>0.01$. That is, Ba may be partly replaced by a trivalent metal.

6) $(BaBr_2)_{1-x-y}(M'Br)(M'''Br_3):bEu^{2+}$ where $M'$ is at least one of the monovalent metals Li, Na, K, Rb, and Cs, and $M'''$ is at least one of the trivalent metals Sc, Y, La, Ce, Pr, Nd, Sm, Gd, Tb, Dy, Ho, Er, Tm, Yb, Lu, Al, Ga, In and Tl, and $0<x+y>0.5$, preferably $0<x+y>0.05$, more preferably $0<x+y>0.01$. That is, Ba may be partly replaced by a combination of a monovalent metal and a trivalent metal.

7) $BaBr_{2-2u}X''{}_{2u}:bEu^{2+}$ where $X''$ is at least one of F, Cl and I and $0<u<0.1$, preferably $0<u<0.08$, more preferably $0<u<0.05$. That is, Br may be partly replaced by a different halogen. It should be noted that the phosphors of the present invention are different from that known BaXX' compounds (X and X' are different halogens), for example, BaBrCl. When a portion of one halogen, e.g., $X^1$, of $BaXX^1$ is replaced by the other halogen X, the intensity of photostimulated luminescence is initially remarkably reduced to near zero as the amount of the replacement X is increased, but is raised again when the composition becomes $BaX_2$ (X is Br or Cl), or very close thereto. This clearly suggests that $BaX_2$ (X is Br or Cl) is a photostimulated luminescence material that is essentially different from BaXX' (X and X' are different halogens), i.e., not a modification or improvement of BaXX' by an addition of $BaX_2$ to BaXX' and thus, only a small amount of the second halogen X can be used in the present invention.

8) $(BaBr_2)_{1-a}A_a:bEu^{2+}$ where A is at least one of the metal oxides BeO, MgO, CaO, SrO, BaO, ZnO, $Al_2O_3$, $Y_2O_3$, $La_2O_3$, $In_2O_3$, $Ga_2O_3$, $SiO_2$, $TiO_2$, $ZrO_2$, $GEO_2$, $SnO_2$, $Nb_2O_5$, $Ta_2O_5$ and $ThO_2$, and $0<a>0.1$, preferably $0<a>0.05$, more preferably $0<a>0.01$. That is, a small amount of a metal oxide may be included.

9) Any combination of compounds 3) to 8). For example, $(BaBr_{2-2u}X^2_{2u})_{1-a}A_a:bEu^{2+}$.

10) Compounds similar to compounds 3) to 9), wherein $Br_2$ is replaced by $Cl_2$. That is, $BaCl_2$ may be used as the base compounds instead of $BaBr_2$.

The above stimulable phosphors may be prepared by firing a mixture of $M^{II}X^1_2$ and an Eu source, e.g., $EuX_2$ (X is a halogen, particularly Br or Cl) Optionally, $M^{II}X^2_2$, $M^IX^1$, $M^IX^2$, $M^{III}X^1_3$, $M^{III}X^2_3$ and/or A may be included in the mixture. The starting materials may be hydrates of the specified compounds.

The mixing can be carried out by dry mixing in a ball mill, by a wet procedure wherein the starting materials are dissolved in water and then dried under vacuum or in air, or heated to remove water and obtain a dry mixture, or other procedures. When a wet process is used, the obtained mixture is dried in air at 200°–600° C. or in vacuum at 100°–300° C., and the mixture is then preferably fired in a reducing atmosphere containing hydrogen. Alternatively, the original firing atmosphere may be an inactive atmosphere or an oxidizing atmosphere to ash and remove the binder, and such firing should then be followed by reducing the Eu in a reducing atmosphere. A suitable reducing atmosphere is an inert gas or nitrogen containing not more than 30.001% hydrogen, for example, the atmosphere may include nitrogen gas, argon gas or helium gas, and preferably is a mixture of helium and hydrogen. The firing temperature depends on the types and compositions of the starting materials, but 500°–1000° C. is generally adequate, with 700°–900° C. being preferable, as in conventional procedures. The firing time depends on the types and compositions of the starting materials, the amount of the starting materials charged into the refractory container, and the firing temperature, etc., but is generally 30 minutes to 48 hours, and preferably is 1–12 hours, at the above firing temperature. After firing, the phosphor is sintered and then must be subjected to pulverization and screening. The pulverization and screening are preferably carried out in a dry inactive gas atmosphere to prevent absorption of moisture; and this is also preferable during the mixing of the starting materials.

The stimulable phosphor is coated onto a support to form an X-ray transforming sheet.

The support may be a Mylar film, a plastic plate, or a ceramic plate, etc., and may include a carbon black layer for improving the resolving power, a reflecting layer of aluminum for improving the sensitivity, and a protecting layer for preventing moisture absorption, etc., on the surface thereof.

The formation of a stimulable phosphor layer on a support can be performed by coating a paste of a stimulable phosphor, a binder and a solvent onto the support, followed by drying and curing the binder, if necessary, by heating irradiation. The binder may be, for example, acryl resin, epoxy resin, urethane resin, phenol resin, nylon resin, teflon resin, or polyester resin, etc. The phosphor preferably has a particle size of less than 100 μm, more preferably less than 30 μm. The stimulable phosphor is preferably mixed with a binder in an amount of 10–99% by weight, more preferably 80–95% by weight, of the stimulable phosphor.

The stimulable phosphor layer may be a layer of a single stimulable phosphor or a mixture of stimulable phosphors including conventional stimulable phosphors, or a multiple stimulable phosphor layer with other stimulable phosphor layers.

If necessary, the coating of the stimulable phosphor is performed by adjusting the viscosity of the paste with a solvent, followed by coating the paste on the support using a doctor blade or a roll coaster, etc. The thickness of the coating (dry) is 50–500 μm, preferably 150–300 μm.

The surface of the stimulable phosphor layer is preferably covered by a protecting layer, etc., and as the protecting layer, a glass layer, a Mylar film, or a polyethylene terephthalate film having an indium tin oxide (ITO) layer, etc., may be used.

The method of producing an X-ray image of the present invention is the same as the conventional method, except that the stimulable phosphor used is novel and a semiconductor laser may preferably be used as the source of the stimulating light. Namely, an X-ray image transforming sheet is irradiated with X-ray image transforming sheet is irradiated with X-rays passed through an object such as a human body, to cause absorption of the transmitted X-rays by the X-ray image transforming sheet. Then, the X-ray image transforming sheet is irradiated with electromagnetic radiation having a wave length of 500–1000 nm, to release the radiation energy stored in the X-ray image transforming sheet as photostimulated luminescence. This photostimulated luminescence is in the form of an image corresponding to the X-ray image transmitted through the object, and therefore, by visualization of the photostimulated luminescence, an X-ray image can be obtained. The visualization process may be performed by conventional photography, but is preferably made by scanning a stimulating beam on the X-ray image transforming sheet, detecting the released stimulated luminescence, transforming the intensity of the detected luminescence into an electric signal, and visualizing the electric signal by electric means. In this latter method, various image treatments can be effected on an X-ray image.

The X-ray image transforming sheet of the present invention is characterized by the capability of using a semiconductor laser as a stimulating light source. Semiconductor lasers having a wave length of 670–680 nm, 780 nm, 830 nm or 900 nm have been developed and put to a practical use, and preferably these semiconductor lasers are used. The known stimulable phosphors are sensitive mainly to stimulating light having shorter wave lengths, and therefore, cannot produce a desired luminescence having a sufficient intensity by a semiconductor laser having a limited output power, and thus only a helium-neon laser having a wave length of 630 nm or a laser having a shorter wave length can be used in a practical sense at present. In contrast, when the stimulable phosphors of the present invention are used, the obtained photostimulated luminescence has an intensity which is more than 1.5 times (depending on the wave length, more than several tens of times) as great as that obtainable using conventional stimulable phosphors. Accordingly, X-ray images can be obtained using X-ray exposures within a range which is tolerable to the human body and a semiconductor laser. Further, the X-ray exposure needed for obtaining X-ray images using semiconductor lasers can be reduced in comparison with conventional stimulable phosphors.

EXAMPLES

Example 1

0.998 mole of 99,999% and 95% purity $BaBr_2$ powders were each mixed separately with 0.001 mole of $EuBr_3$ powder in a ball mill for 6 hours, the mixture was dried in the ball mill by opening a cap thereof, pulling a vacuum and heating at 100° C. for 2 hours, and the mixture was further milled for 6 hours.

The mixed phosphor starting materials were charged into a quartz boat, mounted in a quartz tube, and fired at 850° C. for 2 hours. The firing atmosphere was provided by a gas flow of hydrogen at 10 cc/min and helium at 10 l/min. After firing, the center of the quartz tube was cooled to 400° C., the boat was moved from a high temperature portion to a low temperature portion in the tube, and was allowed to cool to room temperature in the tube. The obtained phosphor was lightly crushed in an agate mortar.

FIG. 1 shows the X-ray diffraction pattern of the obtained phosphor. This phosphor has a crystal structure of $BaBr_2$. The bright line spectrum analyzed on the phosphor had a blue emission peak at 400 nm, which was confirmed to be an emission from $Eu^{2+}$.

For comparison, a known $BaClBr:0.001Eu^{2+}$ compound was prepared in a similar manner.

These phosphors were charged in a measurement cell having a quartz glass window and the spectrum of the stimulated luminescence was analyzed. The light used for stimulation was a spectral light obtained by passing a light from a halogen lamp through a spectrograph. The phosphor in the quartz cell was irradiated with the stimulating light, and the light released from the phosphor as photostimulated luminescence was introduced to a photomultiplier tube through a filter which prevents transmission of the stimulating light therethrough. The introduced light was photoelectrically transferred by the photomultiplier tube to determine the intensity of the stimulated luminescence. The phosphor packed in the cell was irradiated with an X-ray beam emitted from an X-ray tube (a tube voltage of 80 kV and a d-current of 200 mA) located 1 m away from the phosphor (the irradiation time was 0.5 second). The irradiated phosphor was then placed in the above-mentioned measurement cell and analyzed, and the thus-obtained spectrum of the photostimulated luminescence is shown in FIG. 2.

Figure 2:
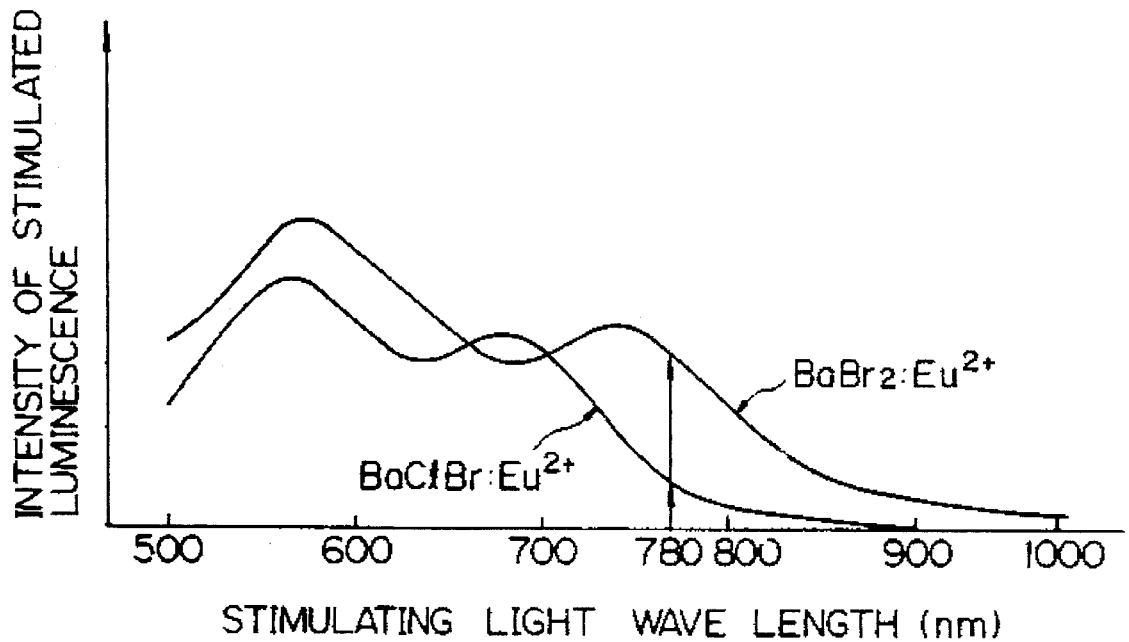
FIG. 2 is a diagram which illustrates the relationship between the intensity of the stimulated luminescence of $BaBr_2:Eu^{2+}$ and the wavelength of the stimulating light.

FIG. 2 demonstrates that, when stimulated by a light having a wave length of 780 nm, $BaBr_2:Eu^{2+}$ exhibits a photostimulated luminescence having an intensity about 5 times higher than that of $BaClBr:Eu^{2+}$. The sensitivity of the phosphor was lowered by only about 10% when the 95% purity phosphor was compared with the 99.999% purity phosphor.

Example 2

Figure 3:
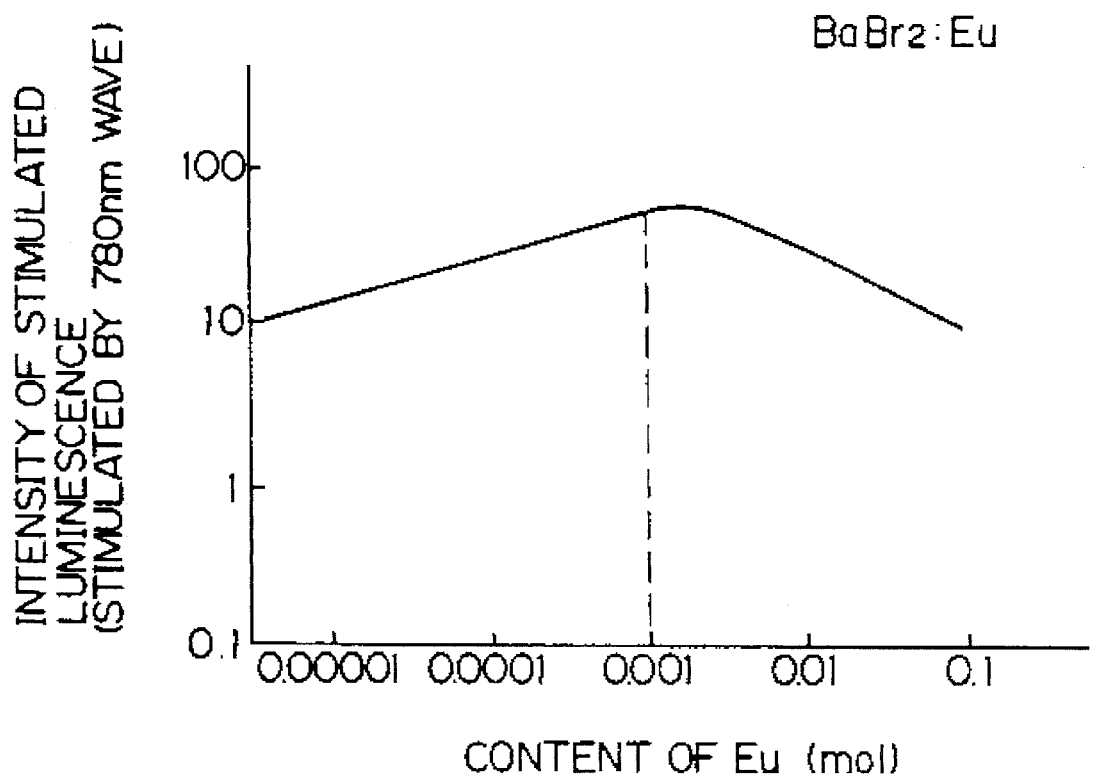
FIG. 3 is a diagram illustrating the relationship between the intensity of the stimulated luminescence of $BaBr_2:Eu^{2+}$ and the Eu content of $BaBr_2:Eu^{2+}$.

A phosphor was prepared in the same manner as in Example 1, except that the ratio of $EuBr_3$ was varied, and the intensity of the photostimulated luminescence thereof was measured. FIG. 3 shows the intensity of the photostimulated luminescence of the phosphor when stimulated by a semiconductor laser having a wave length of 780 nm.

Example 3

To 500 g of the $BaBr_2:E^{2+}$ of Example 1 were added 30 g of polymethylmethacrylate, 3 g of dibutylphthalate, and 150 g of toluene, and the mixture was mixed in a ball mill for 20 hours.

Figure 4:
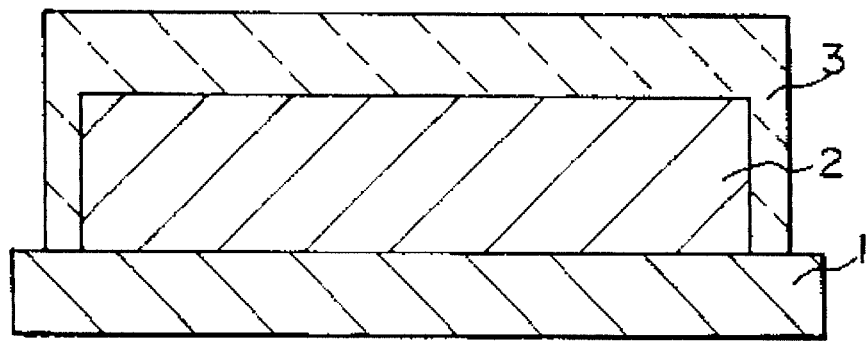
FIG. 4 is a schematic sectional view of an X-ray transforming sheet.

Referring to FIG. 4, the thus-obtained paste of the phosphor was coated on a support 1 of a Mylar film by a doctor blade, and dried to form a phosphor layer 2 having a thickness of 200 μm. The top and side surfaces of the phosphor layer 2 were covered by an ITO layer and an epoxy resin adhesive, to form a protecting layer 3.

The obtained X-ray image transforming sheet was irradiated with a 10 mR X-ray dose followed by scanning with a laser beam from a 10 mW semiconductor laser (wave length 780 nm), to measure the photostimulated luminescence. For comparison, an X-ray image transforming sheet using $BaClBr:Eu^{2+}$ as the phosphor was made and measured in the same manner as in Example 3.

The results are shown in Table 1.

TABLE 1

| Material | Intensity of photostimulated luminescence |
| --- | --- |
| $BaClBr:0.001Eu^{2+}$ | 100 |
| $BaBr_2:0.001Eu^{2+}$ | 480 |

Example 4

Figure 5:
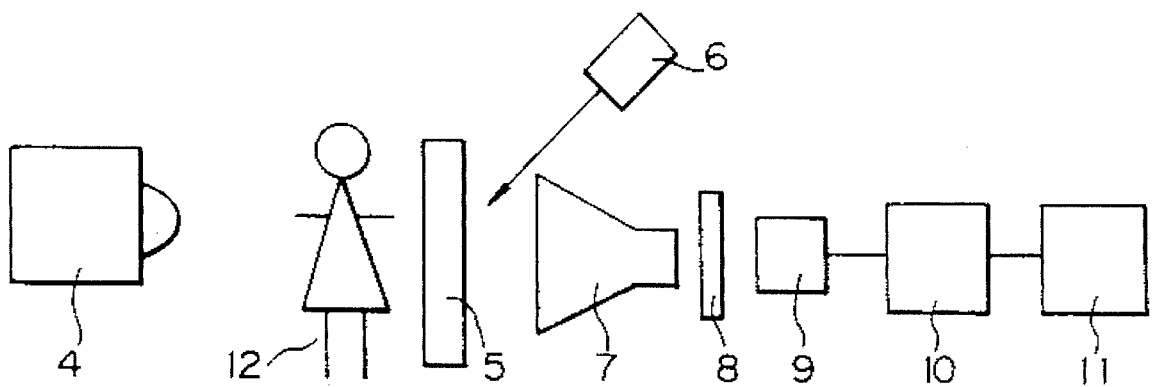
FIG. 5 is a schematic illustration of a system for producing an X-ray image.

The X-ray image transforming sheet of Example 3 was installed in the recording and reading apparatus shown in FIG. 5, and a transmitted image of a human breast was produced. In FIG. 5, 4 denotes an X-ray source, 5 an X-ray image transforming sheet, 6 a laser source, 7 a collector, 8 a filter, 9 a photoelectric transfer device, 10 an image reproducing device, 11 an image display device, and 12 a human body (an object). A clear image was produced at a voltage of 100 V, an irradiation distance of 2 m, an X-ray irradiation amount of 10 MAS, and a reading laser light of 780 nm and 10 mW.

Example 5

First, 208.2 g of $BaCl_2$ and 0.26 g of $EuCl_3$ were mixed in a ball mill for 6 hours, dried in vacuum at 100° C. for 1 hour, and again ball milled for 6 hours. The resultant mixture was charged into a quartz boat and fired at 880° C. in a reducing atmosphere for 2 hours. The atmosphere was a helium gas containing hydrogen.

Figure 6:
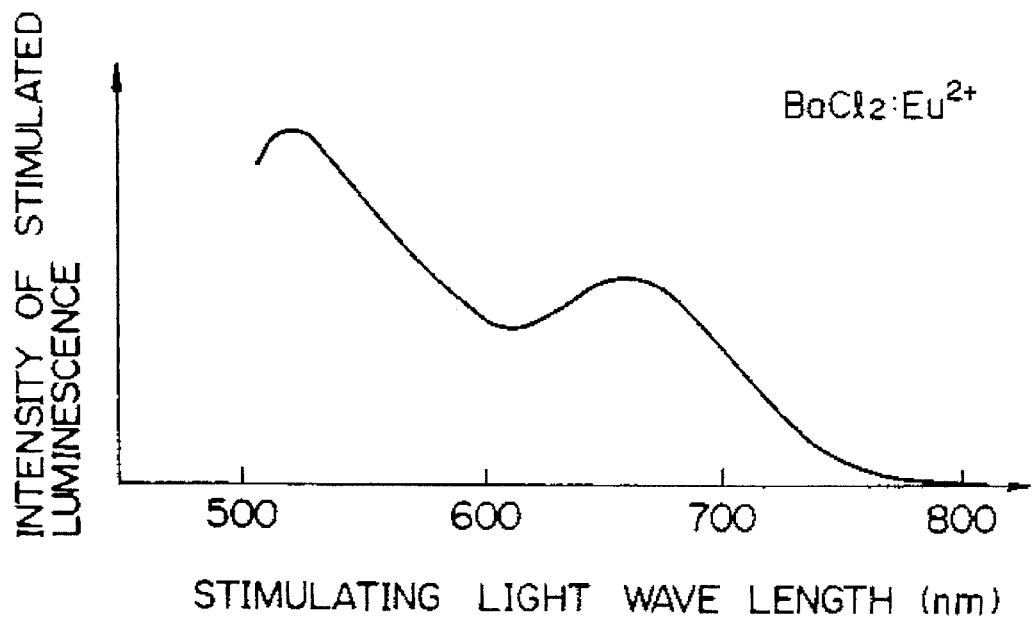
FIG. 6 is a diagram illustrating the relationship between the intensity of the stimulated luminescence of $BaCl_2:Eu^{2+}$ and the wave length of the stimulating light.

The intensity of the stimulated luminescence of the obtained phosphor $BaCl_2:0.001Eu^{2+}$ was measured by irradiation with a 10 mR X-ray dose followed by scanning with a spectroscopic light (wave length 500–900 nm). The result is shown in FIG. 6. The peak is near 670 nm.

Examples 6 and 7

The starting material having a composition shown in Table 2 were mixed in a ball mill for 6 hours, dried in vacuum at 100° C. for 1 hour, and again ball milled for 6 hours. The mixture was charged into a quartz boat and fired at 830° C. in a reducing atmosphere for 2 hours. The atmosphere was a helium gas containing hydrogen. For comparison, the same stimulable phosphor without additional $CaBr_2$ or $MgBr_2$ was prepared.

TABLE 2

| Example | Starting Material | Weight (g) | Composition |
| --- | --- | --- | --- |
| 6 | $BaBr_2$ | 881 | $(Ba_{0.8}Ca_{0.2})Br_2:0.001Eu^{2+}$ |
|   | $CaBr_2$ | 119 |   |
|   | $EuBr_3$ | 2.23 |   |
| 7 | $BaBr_2$ | 856 | $(Ba_{0.8}Mg_{0.2})Br_2:0.001Eu^{2+}$ |
|   | $MgBr_2$ | 144 |   |

TABLE 2-continued

| Example | Starting Material | Weight (g) | Composition |
|---------|-------------------|------------|-------------|
|         | EuBr$_3$          | 2.23       |             |

Figure 7:
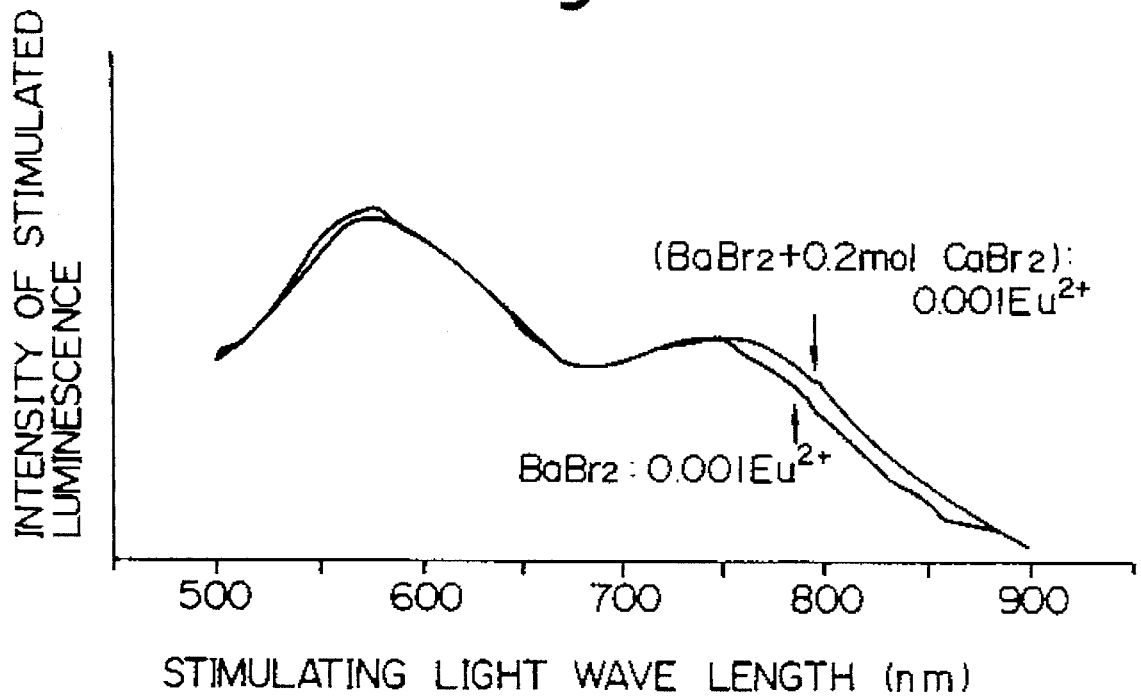
FIG. 7 is a diagram illustrating the relationship between the intensity of the stimulated luminescence of $Ba_{1-x}Ca_xBr_2:Eu^{2+}$ and the wave length of the stimulating light.

The intensity of the stimulated luminescence of the obtained phosphors was measured by irradiation with a 10 mR X-ray dose followed by scanning with a spectroscopic light (wave length 500–900 nm). The results are shown in FIG. 7. When the amount of added CaBr$_2$ was varied, the sensitivity of the luminescence stimulated by a 780–830 nm light was improved 1.2–1.5 times.

Example 8

First, 199.7 g of CaBr$_2$ and 0.39 g of EuBr$_3$ were mixed in a ball mill for 6 hours, dried in vacuum at 100° C. for 1 hour, and again ball milled for 6 hours. The mixture was charged into a quartz boat and fired at 740° C. in a reducing atmosphere for 2 hours. The atmosphere was a helium gas containing hydrogen.

Figure 8:
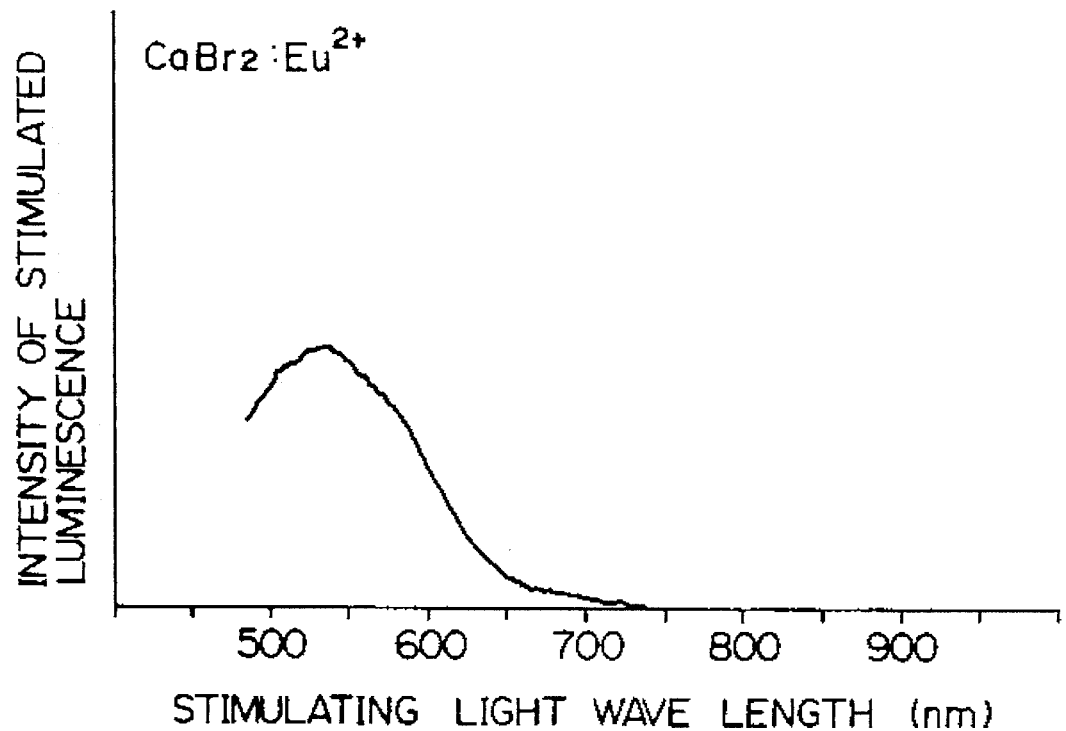
FIG. 8 is a diagram illustrating the relationship between the intensity of the stimulated luminescence of $CaBr_2:Eu^{2+}$ and the wave length of the stimulating light.

The intensity of the stimulated luminescence of the obtained phosphor CaBr$_2$:0.001Eu$^{2+}$ was measured by irradiation with a 10 mR X-ray dose followed by scanning with a spectroscopic light (wave length 500–900 nm). The result is shown in FIG. 8. The peak is near 540 nm.

Example 9

Predetermined amounts of BaBr$_2$, EuBr$_3$ and BaCl$_2$ were mixed in a ball mill for 6 hours, dried in vacuum at 100° C. for 1 hour, and again ball milled for 6 hours. The amount of BaCl$_2$ was varied. The mixture was charged into a quartz boat and fired at 840° C. in a reducing atmosphere for 2 hours. The atmosphere was a helium gas containing hydrogen.

Figure 9:
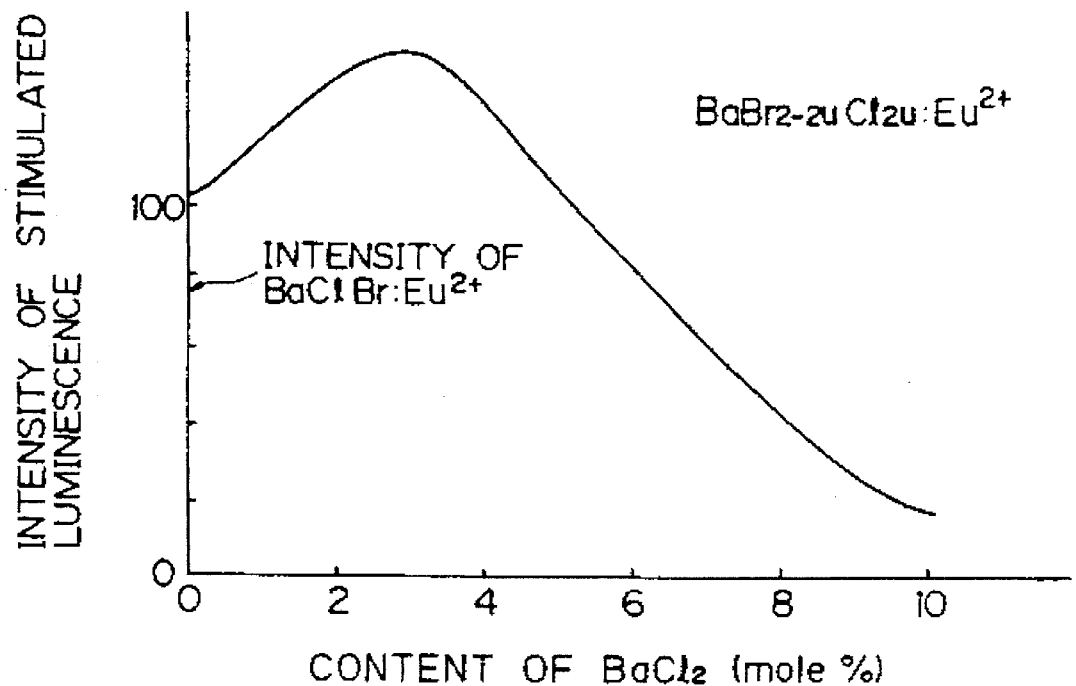
FIG. 9 is a diagram illustrating the relationship between the intensity of the stimulated luminescence of $BaBr_{2-2u}Cl_{2u}:Eu^{2+}$ and the $BaCl_2$ content of $BaBr_{2-2u}Cl_{2u}:Eu^{2+}$.

The intensity of the stimulated luminescence of the obtained phosphor BaBr$_{2-2u}$Cl$_{2u}$:0.001Eu$^{2+}$ (0>u>0.1) was measured by irradiation with a 10 mR X-ray dose followed by scanning with a 100 mW argon ion laser (wave length 532 nm). The results are shown in FIG. 9. It is seen that the intensity of the stimulated luminescence can be improved to about 15 times that of BaBrCl:0.001Eu$^{2+}$ and further, as seen in FIG. 3, the intensity can be improved to about 1.5 times by controlling the content of Eu.

Example 10

Example 9 was repeated except that the firing atmosphere was a nitrogen atmosphere containing hydrogen.

Example 11

Example 9 was repeated except that the starting materials were first wet mixed and then dried.

Example 12

Example 9 was repeated except that the starting materials were first dissolved in water, filtered, wet mixed, and then dried. The intensities of the stimulated luminescence of the phosphors obtained in Examples 9–12 were each measured by irradiation with a 10mR X-ray dose followed by scanning with a 10 mW semiconductor laser (wave length 780 nm). The results (relative intensities when the intensity of Example 9 is set at 100) are shown in Table 3.

TABLE 3

| Example No. | Intensity |
|-------------|-----------|
| 9           | 100       |
| 10          | 80        |
| 11          | 135       |
| 12          | 145       |

Examples 13–16

Predetermined amounts of BaBr$_2$, EuBr$_3$ and NaBr were mixed in a ball mill for 6 hours, dried in a vacuum at 100° C. for 1 hour, and then again ball milled for 6 hours. The amount of NaBr was varied. The mixture was charged into a quartz boat and fired in a reducing atmosphere at 840° C. for 2 hours. The atmosphere was a helium gas containing hydrogen. The intensities of the stimulated luminescence of the obtained phosphors Ba$_{1-x}$Na$_x$Br$_{2-x}$:0.001Eu$^{2+}$ (0>x>0.04) were measured by irradiation with a 10 mR X-ray dose followed by scanning with a 10 mW semiconductor laser (wave length 780 nm). The results are shown in Table 4. The intensities are relative values when the intensity of BaBr$_2$:0.001Eu$^{2+}$ is set at 100.

TABLE 4

| Example No. | Composition | Intensity |
|-------------|-------------|-----------|
| 13 | BaBr$_2$:0.001Eu$^{2+}$ | 100 |
| 14 | Ba$_{0.99}$Na$_{0.01}$Br$_{1.99}$:0.001Eu$^{2+}$ | 108 |
| 15 | Ba$_{0.98}$Na$_{0.02}$Br$_{1.98}$:0.001Eu$^{2+}$ | 135 |
| 16 | Ba$_{0.96}$Na$_{0.04}$Br$_{1.96}$:0.001Eu$^{2+}$ | 117 |

Example 17

First, 294.2 g of BaBr$_2$, 0.39 g of EuBr$_3$, and 0.58 g of NaCl were mixed in a ball mill for 6 hours, dried in vacuum at 100° C. for 1 hour, and again ball milled for 6 hours. The mixture was charged into a quartz boat and fired in a reducing atmosphere at 840° C. for 2 hours. The atmosphere was a helium gas containing hydrogen.

The intensity of the stimulated luminescence of the obtained phosphor Ba$_{0.99}$Na$_{0.01}$Br$_{1.98}$Cl$_{0.01}$:0.001Eu$^{2+}$ was measured by irradiation with a 10 mR X-ray dose followed by scanning with a 10 mW semiconductor laser (wave length 780 nm). The resulting intensity was 120, as a relative value, when the intensity of BaBr$_2$:0.001Eu$^{2+}$ was set at 100.

Examples 18–22

Similar results were obtained when Na was replaced by Li or K in Examples 13–17.

Examples 23–25

Predetermined amounts of BaBr$_2$, EuBr$_3$ and GdBr$_3$ were mixed in a ball mill for 6 hours, dried in vacuum at 100° C. for 1 hour, and again ball milled for 6 hours. The mixture was charged into a quartz boat and fired in a reducing atmosphere at 840° C. for 2 hours. The atmosphere was a helium gas containing hydrogen.

The intensities of the stimulated luminescence of the obtained phosphors Ba$_{1-y}$Gd$_y$Br$_{2+y}$:0.001Eu$^{2+}$ (0>y>0.04) were measured by irradiation with a 10 mR X-ray dose followed by scanning with a 10 mW semiconductor laser (wave length 780 nm). The results are shown in Table 5. The intensities are relative values when the intensity of BaBr$_2$:0.001Eu$^{2+}$ is set at 100.

TABLE 5

| Example No. | Composition | Intensity |
| --- | --- | --- |
| 13 | $BaBr_2:0.001Eu^{2+}$ | 100 |
| 23 | $Ba_{0.99}Gd_{0.01}Br_{2.01}:0.001Eu^{2+}$ | 120 |
| 24 | $Ba_{0.98}Gd_{0.02}Br_{2.02}:0.001Eu^{2+}$ | 132 |
| 25 | $Ba_{0.96}Gd_{0.04}Br_{2.04}:0.001Eu^{2+}$ | 118 |

Example 26

First, 294.2 g of $BaBr_2$, 0.39 g of $EuBr_3$ and 2.64 g of $GdCl_3$ were mixed in a ball mill for 6 hours, dried in vacuum at 100° C. for 1 hour, and again ball milled for 6 hours. The mixture was charged into a quartz boat and fired in a reducing atmosphere at 840° C. for 2 hours. The atmosphere was a helium gas containing hydrogen.

The intensity of the stimulated luminescence of the obtained phosphor $Ba_{0.99}Gd_{0.01}Br_{1.98}Cl_{0.03}:0.001Eu^{2+}$ was measured by irradiation with a 10 mR X-ray dose followed by scanning with a 10 mW semiconductor laser (wave length 780 nm). The resulting intensity was 120, as a relative value, when the intensity of $BaBr_2:0.001Eu^{2+}$ was set at 100.

Examples 27–30

Similar results were obtained when Gd was replaced by Y or Ga in Examples 23–25.

Examples 31–33

Predetermined amounts of $BaBr_2$, $EuBr_3$, NaBr and $GdBr_3$ were mixed in a ball mill for 6 hours, dried in vacuum at 100° C. for 1 hour and again ball milled for 6 hours. The amount of $GdBr_3$ was varied. The mixture was charged into a quartz boat and fired in a reducing atmosphere at 840° C. for 2 hours. The atmosphere was a helium gas containing hydrogen.

The intensities of the stimulated luminescence of the obtained phosphors $Ba_{1-x-y}Na_xGd_yBr_{2-x+y}:0.001Eu^{2+}$ (0>x, y>0.02) were measured by irradiation with a 10mR X-ray dose followed by scanning with a 10 mW semiconductor laser (wave length 780 nm). The results are shown in Table 6. The intensities shown in Table 6. The intensities shown in Table 6 are relative values when the intensity of $BaBr_2:0.001Eu^{2+}$ is set at 100.

TABLE 6

| Example No. | Composition | Intensity |
| --- | --- | --- |
| 13 | $BaBr_2:0.001Eu^{2+}$ | 100 |
| 31 | $Ba_{0.99}Na_{0.005}Gd_{0.005}Br_2:0.001Eu^{2+}$ | 128 |
| 32 | $Ba_{0.98}Na_{0.01}Gd_{0.01}Br_2:0.001Eu^{2+}$ | 132 |
| 33 | $Ba_{0.96}Na_{0.02}Gd_{0.02}Br_2:0.001Eu^{2+}$ | 118 |

Example 34

First, 294.2 g of $BaBr_2$, 0.39 g of $EuBr_3$, 1.32 g of $GdCl_3$ and 0.29 g of NaCl were mixed in a ball mill for 6 hours, dried in vacuum at 100° C. for 1 hour, and again ball milled for 6 hours. The mixture was charged into a quartz boat and fired in a reducing atmosphere at 840° C. for 2 hours. The atmosphere was a helium gas containing hydrogen. The intensity of the stimulated luminescence of the obtained phosphor $Ba_{0.99}Na_{0.005}Gd_{0.005}Br_{1.98}Cl_{0.02}:0.001Eu^{2+}$ was measured by irradiation with a 10 mR X-ray dose followed by scanning with a 10 mW semiconductor laser (wave length 780 nm). The resulting intensity was 115, as a relative value, when the intensity of $BaBr_2:0.001Eu^{2+}$ was set at 100.

Examples 35–37

Similar results were obtained when Gd was replaced by Y or Ga and/or Na was replace by Li or K in Examples 31–33.

Examples 38–54

Predetermined amounts of $BaBr_2$, $EuBr_3$ and each metal oxide A shown in Table 7 were mixed in a ball mill for 6 hours, dried in vacuum at 100° C. for 1 hour, and again ball milled for 6 hours. The ratio of the metal oxide A was 1.0 mole % and that of the Eu element was 0.1 mole %. The mixture was charged into a quartz boat and fired in a reducing atmosphere at 840° C. for 6 hours. The atmosphere was a helium gas (5 l/min) containing hydrogen (5 cc/min).

Figure 10:
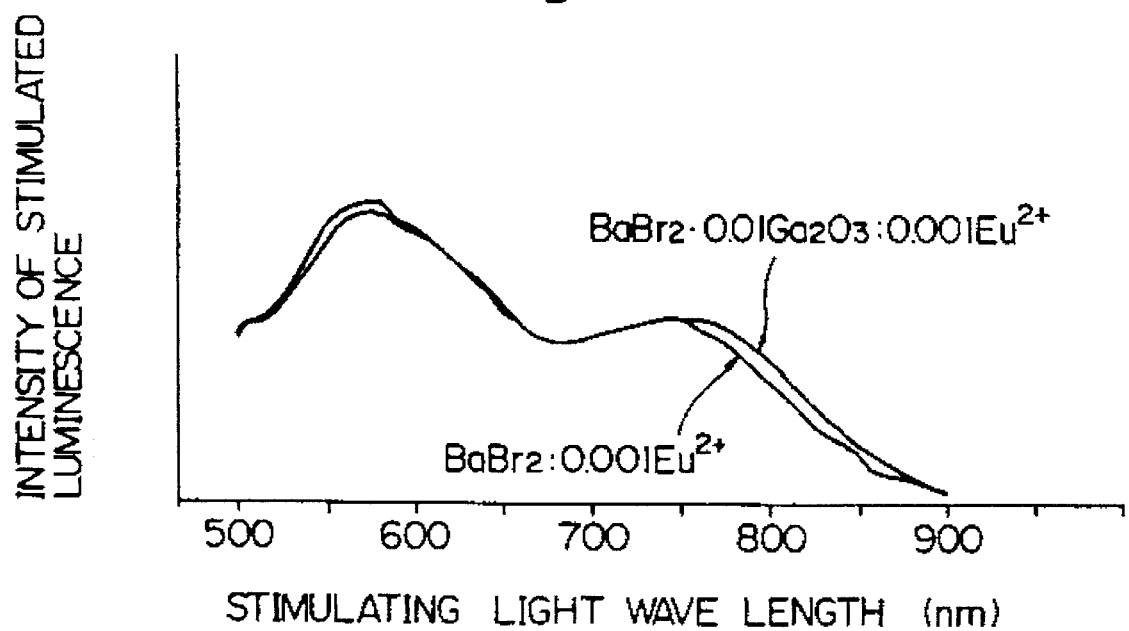
FIG. 10 is a diagram illustrating the relationship between the intensity of the stimulated luminescence of $(BaBr_2)(0.01V_2GaO_3):Eu^{2+}$ and the wave length of the stimulating light.

The intensity of the stimulated luminescence of the obtained phosphor $(BaBr_2)(0.01Ga_2O_3):0.001Eu^{2+}$ was measured by irradiation with a 10 mR X-ray dose followed by scanning with various wave lengths. The results are shown in FIG. 10.

The intensities of the stimulated luminescence of the obtained phosphors $(BaBr_2)0.01A:0.001Eu^{2+}$ were measured by irradiation with a 10 mR X-ray dose followed by scanning with a 10 mW semiconductor laser (wave length 780 nm). The results are shown in Table 7. The intensities shown are relative values when the intensity of $BaBr_2:0.001Eu^{2+}$ is set at 100.

TABLE 7

| Example No. | Metal Oxide A | Peak Intensity | Intensity at 780 nm |
| --- | --- | --- | --- |
| 13 | — | 100 | 52 |
| 38 | $Ga_2O_3$ | 105 | 61 |
| 39 | $Al_2O_3$ | 103 | 59 |
| 40 | $SiO_2$ | 101 | 59 |
| 41 | MgO | 98 | 58 |
| 42 | CaO | 95 | 56 |
| 43 | BaO | 101 | 60 |
| 44 | ZnO | 95 | 55 |
| 45 | $Y_2O_3$ | 103 | 60 |
| 46 | $La_2O_3$ | 97 | 56 |
| 47 | $In_2O_3$ | 95 | 55 |
| 48 | $TiO_2$ | 102 | 59 |
| 49 | $ZrO_2$ | 105 | 60 |
| 50 | $GeO_2$ | 103 | 60 |
| 51 | $SnO_2$ | 93 | 53 |
| 52 | $Nb_2O_5$ | 95 | 54 |
| 53 | $Ta_2O_5$ | 92 | 51 |
| 54 | $ThO_2$ | 93 | 52 |

Example 55

Figure 11:
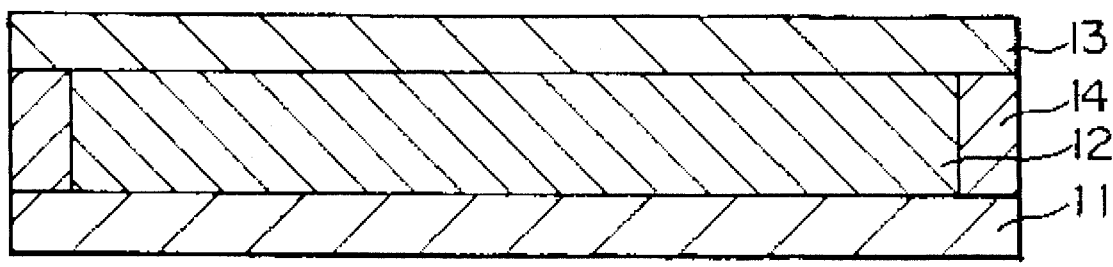
FIGS. 11 and 12 are schematic sectional views of X-ray transforming sheets.

X-ray image transforming sheets having a structure shown in FIG. 11 were made. In FIG. 11, the reference numeral 11 denotes a support, 12 a stimulable phosphor layer, 13 a protecting layer, and 14 an adhesive.

A moisture permeation test was performed on the materials used for the protecting layer 13 and support 11 of the above X-ray image transforming sheets, under JIS/Z0208. The temperature was 40° C. and the humidity was 90%. The sheet materials used were a glass plate having a thickness of 80 μm, an aluminum plate having a thickness of 0.2 mm, and a stainless steel plate having a thickness of 0.2 mm. For comparison, a polyethylene terephthalate (PET) film having a thickness of 50 μm and a Saran UB film having a thickness of 25 μm were used.

The results are shown in Table 8.

TABLE 8

| Sample Measured | Humidity Permeation (g/m² 24h) |
| --- | --- |
| PET film | 8 |
| Saran UB | 0.7 |
| Glass plate | less than 0.001 |
| Aluminum plate | less than 0.001 |
| Stainless plate | less than 0.001 |

It is seen that inorganic plates made of metal or glass provide excellent protecting layers.

Example 56

Figure 12:
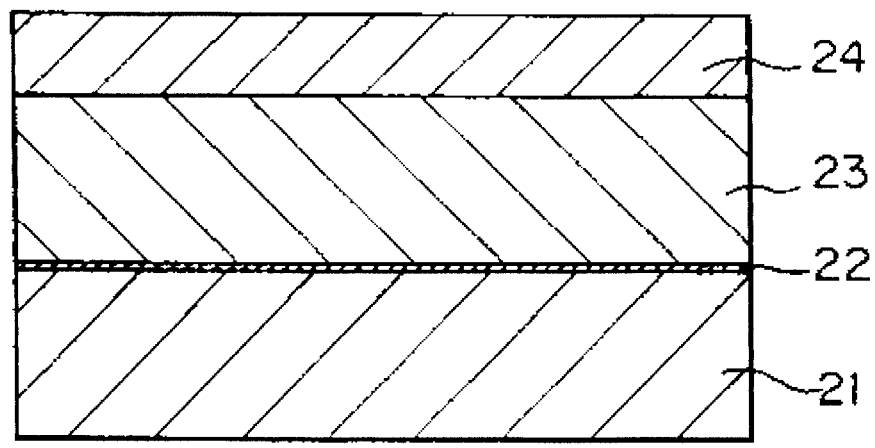

X-ray image transforming sheets having a structure shown in FIG. 12 were made. On a glass plate 21 having a thickness of 1.1 mm, a dielectric reflecting layer 22 of $SiO_2$, AlN, $SnO_2$, $In_2O_3$, ZnO, $Si_3N_4$, $TiO_2$, $MgF_2$ or LiF having a thickness of about 50 nm was formed by evaporation or sputtering and then a stimulable phosphor layer 23 of $BaBr_2:Eu^{2+}$ having a thickness of about 200 μm and a glass protecting layer 24 having a thickness of 700 μm were formed.

The intensities of the stimulated luminescence of the obtained X-ray image transforming sheets were measured by irradiation with a 10 mR X-ray dose followed by scanning with a 10 mW semiconductor laser (wave length 780 nm). The results are shown in Table 9. The intensities shown are relative values when the intensity of the sheet without a dielectric reflecting layer is set at 100.

TABLE 9

| Sample Measured | Intensity of stimulated luminescence |
| --- | --- |
| $SiO_2$ | 1.30 |
| AlN | 1.35 |
| $SnO_2$ | 1.50 |
| $In_2O_3$ | 1.45 |
| ZnO | 1.45 |

Similar results were obtained when the supports had thicknesses of 1.5 mm.

Example 57

Figure 13:
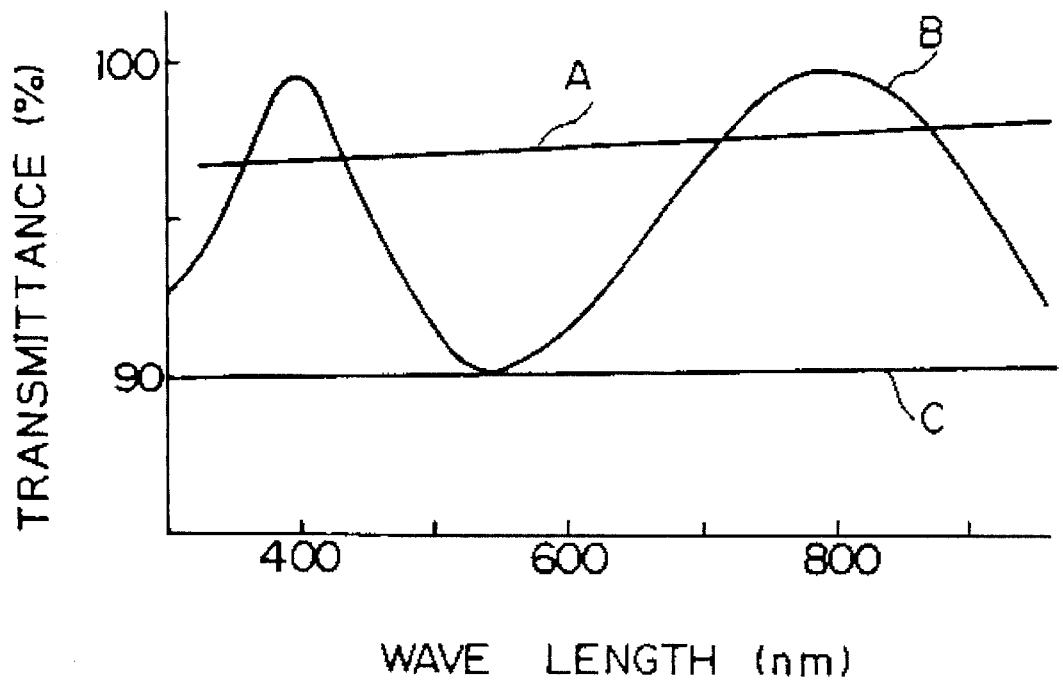
FIG. 13 is a diagram which shows the percentage transmission of a glass plate with an anti-reflecting layer.

The light transmittances of glass plates having a thickness of 0.5 mm and coated on both surfaces with an anti-reflecting multilayer (20 layers of $MgF_2$ having a thickness of 100–300 nm) or an anti-reflecting single layer (a layer of $MgF_2$ having a thickness of 100 nm and adjusted to a wave length of 780 nm) were measured and shown as the curves A and B, respectively, in FIG. 13. For comparison, the light transmittance of the same glass plate without an anti-reflecting layer was measured and shown as the curve C in FIG. 13. It is seen in FIG. 13 that the transmittance was improved by about 7–9% when the anti-reflecting multilayer was applied, as compared to the case without an anti-reflecting layer. The transmittance was improved by about 2–3% when the anti-reflecting single layer was used, as compared to the case where the anti-reflecting multilayer was used.

Figure 14:
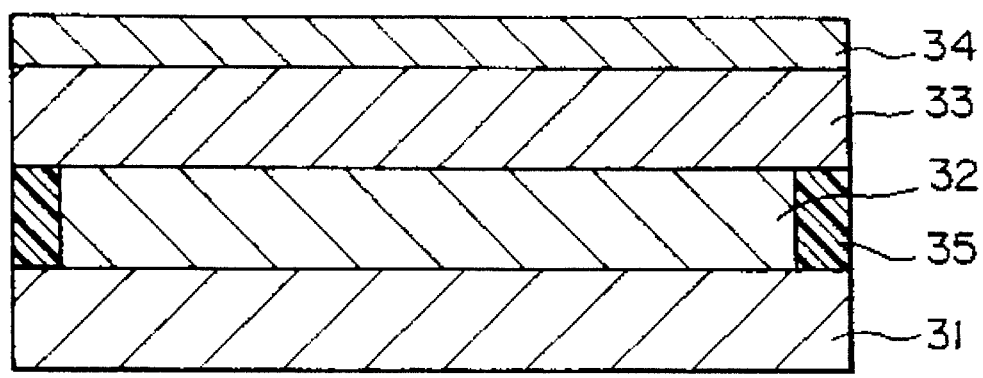
FIG. 14 is a schematic sectional view of an X-ray transforming sheet.
Figure 1:
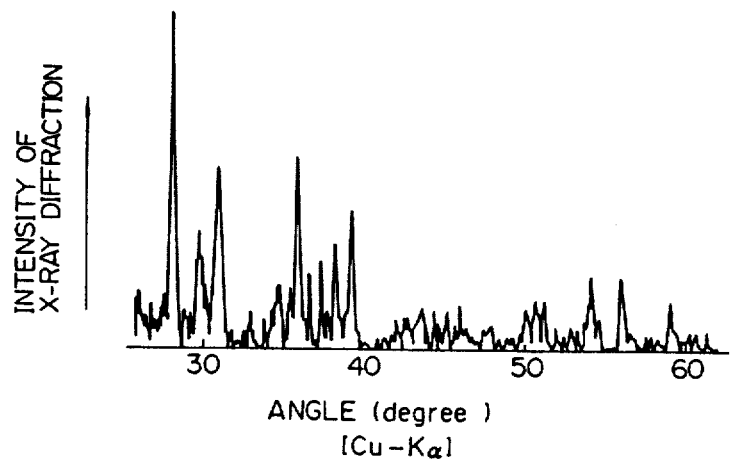
Figure 2:
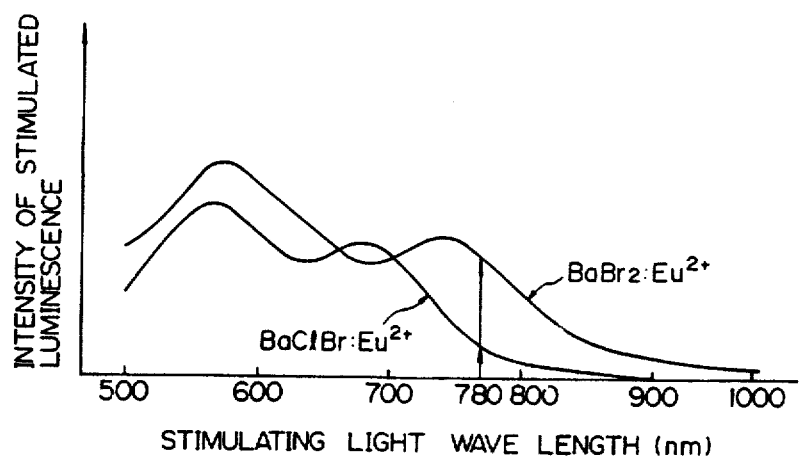
Figure 3:
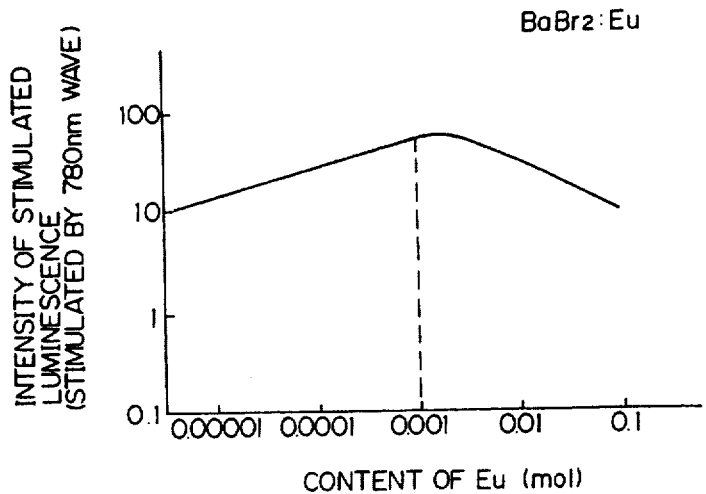
Figure 4:
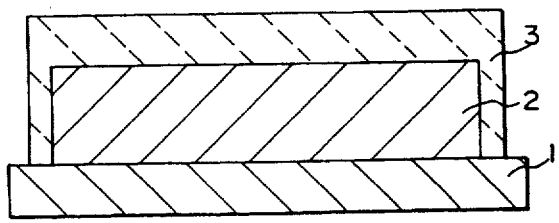
Figure 5:
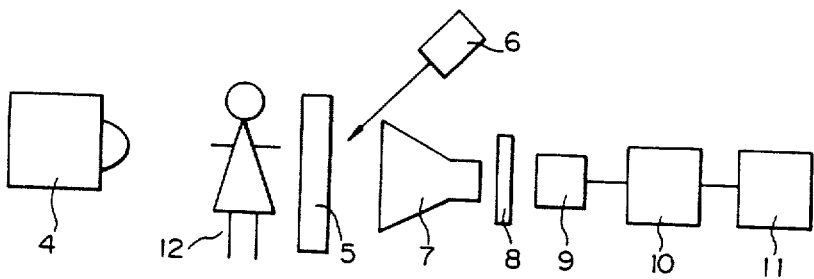
Figure 6:
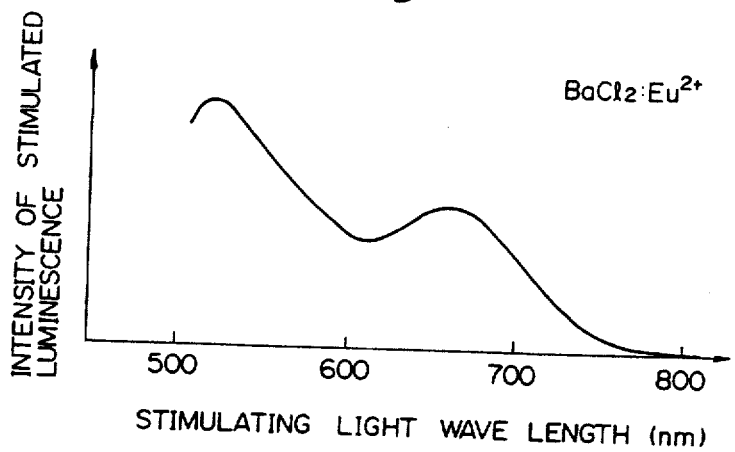
Figure 7:
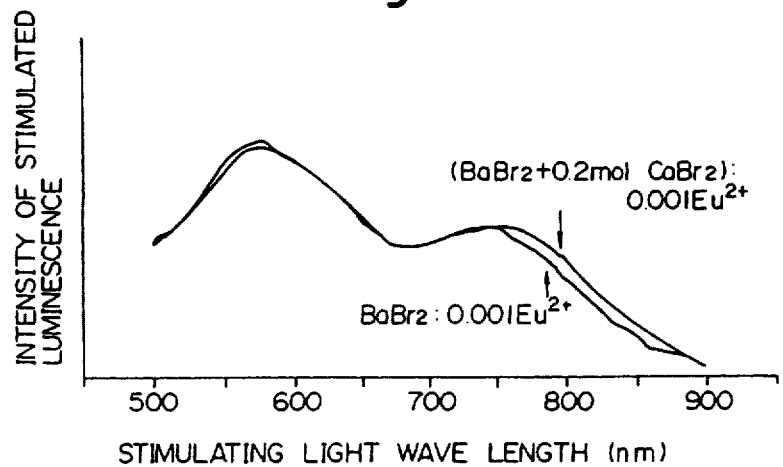
Figure 8:
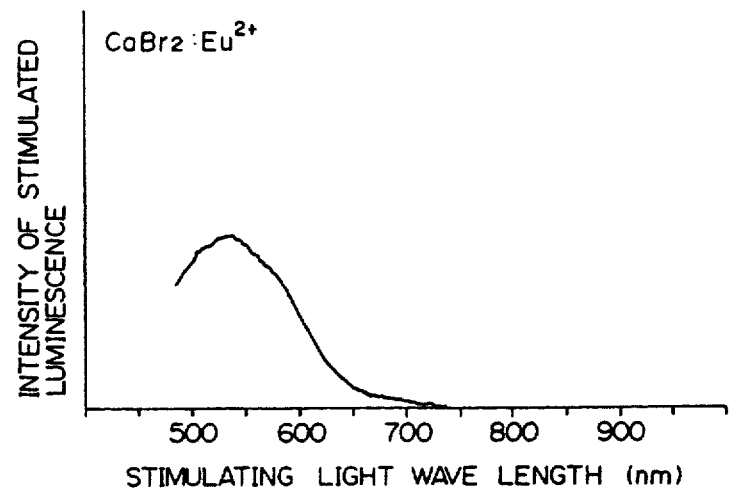
Figure 9:
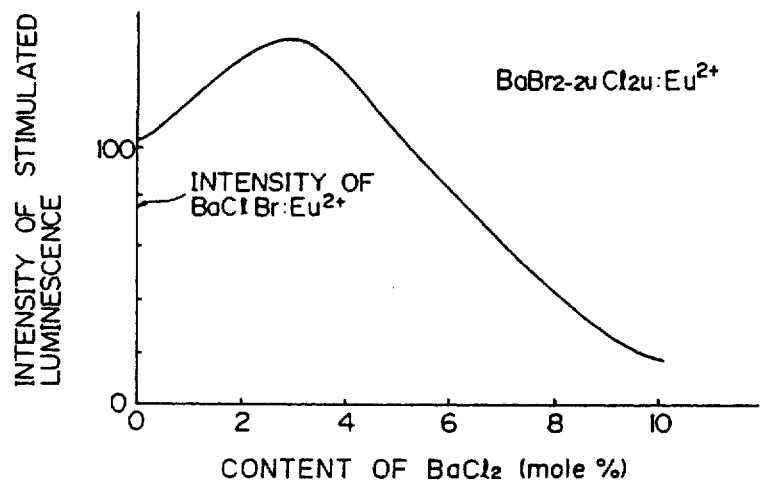
Figure 10:
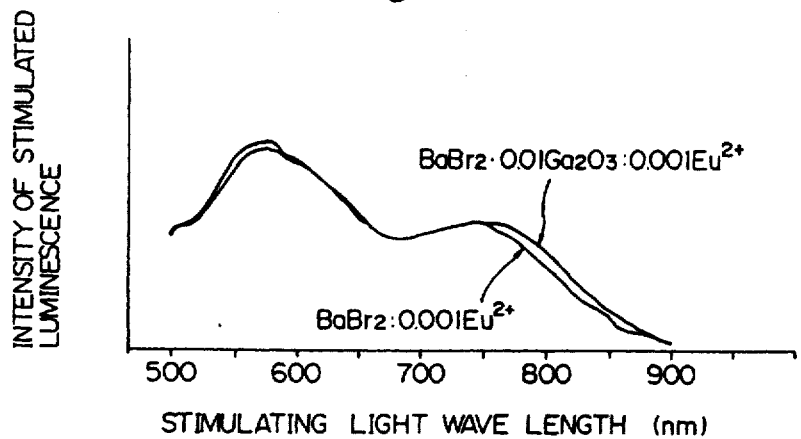
Figure 13:
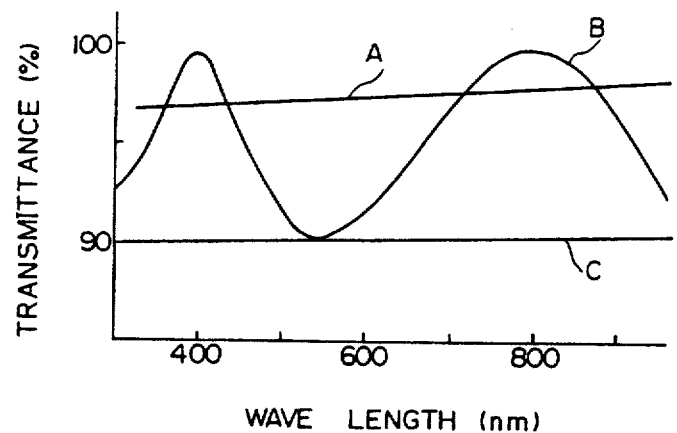
Figure 14:
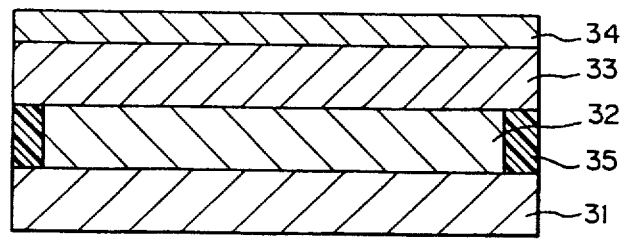

X-ray image transforming sheets having a structure shown in FIG. 14 were made. Support 31 was a glass plate having a thickness of 1.11 mm, and a stimulable phosphor layer 32 of $BaBr_2:Eu^{2+}$ (0.3 mm thick) was coated thereon as a paste containing an acryl resin using a doctor blade. Further, a glass plate (0.5 mm thick) 33 was coated with an anti-reflecting layer 34 as described above and was mounted on the stimulable phosphor layer 2 using an adhesive 35. For comparison, a glass plate without an anti-reflecting layer was used on another sheet.

The sensitivities of these X-ray image transforming sheets are shown in Table 10. The measurements were performed by irradiation with a 10 mR X-ray dose followed by scanning with a 10 mW semiconductor laser (wave length 780 nm).

TABLE 10

| Protecting layer | Sensitivity |
| --- | --- |
| Glass only | 1000 |
| Glass with an anti-reflecting multilayer (one side) | 1100 |
| Glass with a single anti-reflecting layer (one side) | 1170 |
| Glass with a single anti-reflecting layer (both sides) | 1180. |

We claim:

1. A method of forming an X-ray image comprising:

providing an X-ray image transforming sheet which comprises a stimulable phosphor on a substrate, said stimulable phosphor exhibiting photostimulated luminescence when excited by visible or infrared light, said phosphor being represented by the formula:

$BaBr_2:bEu^{2+}$ , wherein 0<b>0.2;

exposing said transforming sheet to X-rays passed through an object to thereby cause said X-rays to be absorbed by said phosphor;

stimulating the exposed transforming sheet with electromagnetic waves having a wave length of 500 to 1000 nm to release the energy stored in the phosphor as a photostimulated luminescent light; and detecting the released photostimulated luminescent light to obtain an image of the object.

2. A method of forming an x-ray image as set forth in claim 1, wherein the electromagnetic waves for stimulating the exposed transforming sheet have a wavelength which is either 780 nm, 830 nm or 900 nm, or which is in the range of 670 to 680 nm.

3. A method of forming an X-ray image comprising:

providing an X-ray image transforming sheet which comprises a stimulable phosphor on a substrate, said stimulable phosphor exhibiting photostimulated luminescence when excited by visible or infrared light, said phosphor being represented by the formula:

$(BaBr_2)_{1-a} \cdot A_a : bEu^{2+}$, where A represents at least one metal oxide selected from the group consisting of BeO, MgO, CaO, SrO, BaO, ZnO, $Al_2O_3$, $Y_2O_3$, $La_2O_3$, $In_2O_3$, $Ga_2O_3$, $SiO_2$, $TiO_2$, $ZrO_2$, $GeO_2$, $SnO_2$, $Nb_2O_5$, $Ta_2O_5$ and $ThO_2$; and wherein $0<a>0.1$ and $0<b>0.2$;

exposing said transforming sheet to X-rays passed through an object to thereby cause said X-rays to be absorbed by said phosphor;

stimulating the exposed transforming sheet with electromagnetic waves having a wave length of 500 to 1000 nm to release the energy stored in the phosphor as a photostimulated luminescent light; and detecting the released photostimulated luminescent light to obtain an image of the object.

4. A method of forming an x-ray image as set forth in claim 3, wherein the electromagnetic waves for stimulating the exposed transforming sheet have a wavelength which is either 780 nm, 830 nm or 900 nm, or which is in the range of 670 to 680 nm.

* * * * *

UNITED STATES PATENT AND TRADEMARK OFFICE
CERTIFICATE OF CORRECTION

PATENT NO. : 5,543,080

DATED : August 6, 1996

INVENTOR(S) : Nobuhiro Iwase et al.

Page 1 of 12

It is certified that error appears in the above-indentified patent and that said Letters Patent is hereby corrected as shown below:

The title page, should be deleted to appear as per attached title page.

The sheets of drawings consisting of Figures 1-14 should be deleted to appear as per attached sheets.

United States Patent
Iwase et al.

[11] Patent Number: 5,543,080
[45] Date of Patent: Aug. 6, 1996

[54] METHOD OF FORMING AN X-RAY IMAGE USING PHOTOSTIMULABLE PHOSPHOR

[75] Inventors: Nobuhiro Iwase, Atsugi; Hiroshi Kano, Sagamihara; Shinji Tadaki, Atsugi; Masami Hasegawa; Nagaaki Koshino, both of Yokohama, all of Japan

[73] Assignee: Fujitsu Limited, Kawasaki, Japan

[21] Appl. No.: 378,319

[22] Filed: Jan. 25, 1995

Related U.S. Application Data

[60] Continuation of Ser. No. 98,722, Jul. 29, 1993, abandoned, which is a division of Ser. No. 54,343, Apr. 7, 1993, abandoned, which is a continuation of Ser. No. 585,625, Sep. 20, 1990, abandoned.

[30] Foreign Application Priority Data

Sep. 20, 1989 [JP] Japan .................. 1-241801

[51] Int. Cl.$^6$ .................. C09K 11/61
[52] U.S. Cl. .................. 252/301.4 H
[58] Field of Search .................. 252/301.4 H

[56] References Cited

U.S. PATENT DOCUMENTS

| | | | |
|---|---|---|---|
| 3,163,608 | 12/1964 | Yocom | 252/301.4 H |
| 3,447,097 | 5/1969 | Kiss | 252/301.4 H |
| 3,859,527 | 1/1975 | Luckey | 250/327 |
| 4,239,968 | 12/1990 | Kotera et al. | 250/327.1 |

FOREIGN PATENT DOCUMENTS

| | | | |
|---|---|---|---|
| 896453 | 3/1972 | Canada | 252/301.4H |
| 102051 | 3/1984 | European Pat. Off. | |
| 107192 | 5/1984 | European Pat. Off. | |
| 159015 | 10/1985 | European Pat. Off. | |
| 159014 | 10/1985 | European Pat. Off. | |
| 174875 | 3/1986 | European Pat. Off. | |
| 8908921 | 9/1989 | European Pat. Off. | |
| 2-58593 | 2/1990 | Japan | |

OTHER PUBLICATIONS

Patent Abstracts of Japan, vol. 14, No. 232 (C–719) (4175) 17 May 1990, & JP-A-2 58593 (Fujitsu) 27 Feb. 1990, the whole document.

Patent Abstracts of Japan, vol. 14, No. 261 (C–725) (4204) 6 Jun. 1990, & JP-A-2 75686 (Fujitsu) 15 Mar. 1990, the whole document.

K. Takahashi et al., "Phosphostimulated Luminescence (PSL) and Color Centers in BaFX=Eu$^{2+}$+(X=Cl, Br, I) Phosphors", J. Electrochem. Soc., Jun. 1985, pp. 1492–1494.

*Primary Examiner*—Melissa Bonner
*Attorney, Agent, or Firm*—Staas & Halsey

[57] ABSTRACT

A method for forming an X-ray image. The method involves the use of an X-ray transforming sheet which includes a novel stimulable phosphor on a substrate. The phosphor has a high sensitivity to a semiconductor laser as a stimulating light and is represented by the formula:

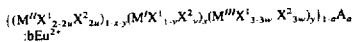

where $M''$ represents at least one divalent metal such as Ba, Be, Mg or Ca; $M^1$ represents at least one monovalent metal such as Li, Na, K, Rb or Cs; $M'''$ represents at least one trivalent metal such as Sc, La, Y, Ce, Pr, Nd, Sm, Gd, Tb, Dy, Ho, Er, Tm, Yb, Lu, Al, Ga, In or Tl; $X^1$ represents Br or Cl; $X^2$ represents at least one halogen atom that is different from $X^1$; A represents at least one metal oxide such as BeO, MgO, CaO, SrO, BaO, ZnO, $Al_2O_3$, $Y_2O_3$, $La_2O_3$, $In_2O_3$, $Ga_2O_3$, $SiO_2$, $TiO_2$, $ZrO_2$, $GeO_2$, $SnO_2$, $Nb_2O_5$, $Ta_2O_5$ and $ThO_2$; and wherein $0>x+y>0.5$; $0>u+v+w<0.1$; $0>a>0.1$; and $0<b>0.2$. The transforming sheet is exposed to X-rays and then the exposed phosphor is stimulated with electromagnetic radiation to release the stored energy as a photostimulated luminescent light which may be detected to thereby obtain an image of the object.

4 Claims, 7 Drawing Sheets

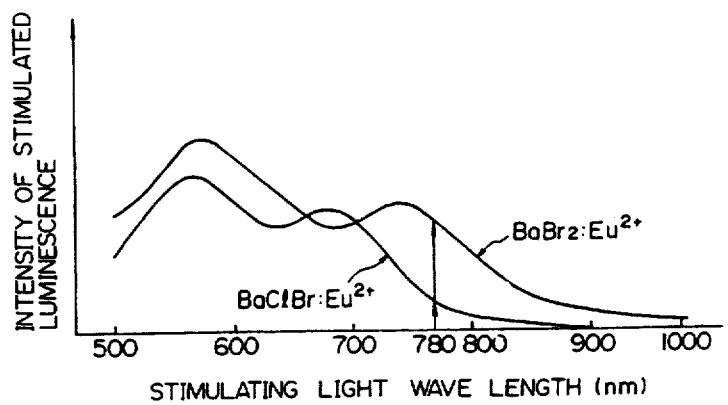

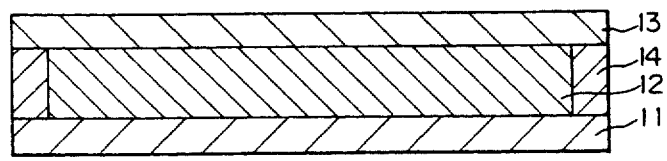
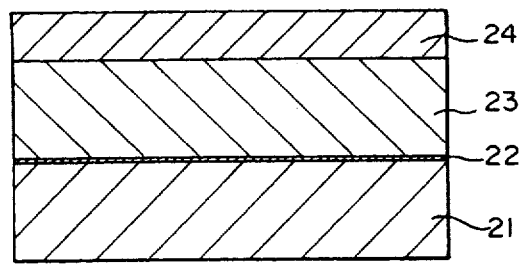

UNITED STATES PATENT AND TRADEMARK OFFICE
CERTIFICATE OF CORRECTION

PATENT NO. : 5,543,080

DATED : August 6, 1996

INVENTOR(S) : Nobuhiro IWASE et al.

It is certified that error appears in the above-indentified patent and that said Letters Patent is hereby corrected as shown below:

Title Page, Column 2, in the ABSTRACT, line 18, delete "0>x+y>0.5; 0>u+v+w<0.1; 0>a.0.1" and substitute --$0 \leq x+y \leq 0.5$; $0 \leq u+v+w<0.1$; $0 \leq a \leq 0.1$--;
  line 19, delete "0<b>0.2" and substitute -- $0<b \leq 0.2$ --.

Column 1, line 48, delete "bypersons" and substitute --by persons--.

Column 2, line 54, delete "lengths, more" and substitute --lengths. More--;
  line 66, delete "($M^I X^1_{1-v} X^2$)" and substitute --$(M^I X^1_{1-v} X^2_v)$--.

Column 3, lines 13-14, delete "0>x+y>0.5; 0>u+v+w<0.1; 0>a>0.1; and 0<b>0.2" and substitute --$0 \leq x+y \leq 0.5$; $0 \leq u+v+w \leq 0.1$; $0 \leq a \leq 0.1$; and $0<b \leq 0.2$--.

Column 4, line 13, delete "0<b>0.2" and substitute --$0<b \leq 0.2$--;
  line 14, delete "0.0005>b>0.002" and substitute --$0.0005 \leq b \leq 0.002$--;
  line 31, delete "0<x>0.5" and substitute --$0<x \leq 0.5$--;
  line 32, delete "0<x>0.05" and "0<x>0.01" and substitute --$0<x \leq 0.05$-- and --$0<x \leq 0.01$--, respectively;
  line 36, delete "0<y>0.5" and substitute --$0<y \leq 0.5$--;
  line 37, delete "0<y>0.05" and "0<y>0.01" and substitute --$0<y \leq 0.05$-- and --$0<y \leq 0.01$--, respectively;

UNITED STATES PATENT AND TRADEMARK OFFICE
CERTIFICATE OF CORRECTION

PATENT NO. : 5,543,080
DATED : August 6, 1996
INVENTOR(S) : Nobuhiro IWASE et al.

It is certified that error appears in the above-indentified patent and that said Letters Patent is hereby corrected as shown below:

line 44, delete "0<x+y>0.5" and "0<x+y>0.05" and substitute --0<x+y≤0.5-- and --0<x+y≤0.05--, respectively;
line 44, delete "0<x+y>0.5" and substitute --0<x+y≤0.01--;

Column 5, line 2, delete "0<a>0.1" and substitute --0<a≤0.1--;
line 3, delete "0<a>0.05" and "0<a>0.1" and substitute --0<a≤0.05-- and --0<a≤0.01--, respectively;
line 12, after "(C1)", insert --.--.

Column 6, lines 16-17, delete "X-ray image transforming sheet is irradiated with".

Column 9, line 39, delete "(0>u>0.1)" and substitute --(0≤u≤0.1)--;
line 44, delete "15" and substitute --1.5--;
line 62, after "dried", insert new paragraph.

Column 10, line 18, after "hydrogen", insert new paragraph;
line 20, delete "(0>x>0.04)" and substitute --(0≤x≤0.04)--;
line 62, delete "(0>y>0.04)" and substitute --(0≤y≤0.04)--.

Column 11, lines 40-41, delete "(0>x,y>0.02)" and substitute -- --(0≤x,y≤0.02) --; delete "10mR" and substitute --10 mR--;
line 44, delete "The intensities shown in Table 6".

UNITED STATES PATENT AND TRADEMARK OFFICE
CERTIFICATE OF CORRECTION

PATENT NO. : 5,543,080
DATED : August 6, 1996
INVENTOR(S) : Nobuhiro IWASE et al.

It is certified that error appears in the above-indentified patent and that said Letters Patent is hereby corrected as shown below:

Column 12, line 17, delet "(5 1/min)" and substitute
--(5 $\ell$/min)--.

Column 14, line 39, delete "0<b>0.2" and substitute
--0<b$\leq$0.2--;
    *line 51, delete "x-ray" and substitute --X-ray--;

Column 15, line 3, delete "0<a>0.1 and 0<b>0.2" and substitute --0<a$\leq$0.1 and 0<b$\leq$0.2--.

Column 16, line 3, delete "x-ray" and substitute --X-ray--.

Signed and Sealed this

Sixth Day of May, 1997

*Attest:*

*Attesting Officer*

BRUCE LEHMAN

*Commissioner of Patents and Trademarks*